United States Patent
Butler et al.

(10) Patent No.: US 11,447,356 B2
(45) Date of Patent: Sep. 20, 2022

(54) SYSTEM AND METHOD FOR ALIGNING AND JOINING THE SAME SIDES OF TWO WEB MATERIALS

(71) Applicant: Butler Automatic, Inc., Middleborough, MA (US)

(72) Inventors: Andrew P. Butler, Mattapoisett, MA (US); Michael A. Mucci, Upton, MA (US); Adam Hirshan, Barrington, RI (US)

(73) Assignee: Butler Automatic, Inc., Middleborough, MA (US)

( * ) Notice: Subject to any disclaimer, the term of this patent is extended or adjusted under 35 U.S.C. 154(b) by 295 days.

(21) Appl. No.: 16/877,098

(22) Filed: May 18, 2020

(65) Prior Publication Data

US 2021/0354946 A1 Nov. 18, 2021

(51) Int. Cl.
*B65H 21/00* (2006.01)
(52) U.S. Cl.
CPC ................... *B65H 21/00* (2013.01)
(58) Field of Classification Search
CPC ............. B65H 21/00; B65H 19/1852; B65H 19/1873; B65H 2301/4634
See application file for complete search history.

(56) References Cited

U.S. PATENT DOCUMENTS

| | | |
|---|---|---|
| 3,407,806 A | 10/1968 | Hulka et al. |
| 3,753,833 A | 8/1973 | Bassett et al. |
| 3,756,526 A | 9/1973 | Bassett et al. |
| 3,813,053 A | 5/1974 | Butler, Jr. et al. |
| 3,822,838 A | 7/1974 | Butler, Jr. et al. |
| 3,906,232 A | 9/1975 | Meihofer |
| 3,912,145 A | 10/1975 | Meihofer |
| 3,928,844 A | 12/1975 | Meihofer |
| 3,973,174 A | 8/1976 | Corcoran et al. |
| 3,990,647 A | 11/1976 | Clifford |
| 3,994,449 A | 11/1976 | Wales |
| 4,015,794 A | 4/1977 | Meihofer |
| 4,021,002 A | 5/1977 | Meihofer |
| 4,021,031 A | 5/1977 | Meihofer |
| RE29,365 E | 8/1977 | Butler, Jr. |
| 4,069,959 A | 1/1978 | Bartell et al. |
| 4,100,012 A | 7/1978 | Meihofer et al. |
| 4,143,568 A | 3/1979 | Cogswell |
| 4,159,808 A | 7/1979 | Meihofer |
| 4,190,475 A * | 2/1980 | Marschke .......... B65H 19/1873 226/97.1 |
| 4,227,458 A | 10/1980 | Kapoor |
| 4,273,045 A | 6/1981 | Crowley |

(Continued)

FOREIGN PATENT DOCUMENTS

| | | |
|---|---|---|
| EP | 0847948 A2 | 6/1998 |
| EP | 0847948 A3 | 8/1998 |
| WO | WO-96/34819 A1 | 11/1996 |

OTHER PUBLICATIONS

"European Search Report and Written Opinion," European Application No. 21174283.8-1017, Applicant: Butler Automatic, Inc., dated Oct. 15, 2021, pp. 1-6.

*Primary Examiner* — Sang K Kim

(57) ABSTRACT

A system and method for performing a splicing operation where the splicing apparatus is configured to orient the web to ensure the two sealing sides are presented to each other and the splice is always made on one side of the web.

12 Claims, 11 Drawing Sheets

(56) References Cited

U.S. PATENT DOCUMENTS

| | | | |
|---|---|---|---|
| 4,284,463 A | | 8/1981 | Wright |
| 4,288,273 A | | 9/1981 | Butler, Jr. et al. |
| 4,289,969 A | | 9/1981 | Cooperstein et al. |
| 4,290,359 A | | 9/1981 | Kapoor |
| 4,455,190 A | | 6/1984 | Bianchetto et al. |
| 4,948,060 A | | 8/1990 | Kurz et al. |
| 5,190,234 A | | 3/1993 | Ezekiel |
| 5,249,917 A | | 10/1993 | Neumann et al. |
| 5,253,819 A | | 10/1993 | Butler, Jr. |
| 5,301,891 A | | 4/1994 | Duguay |
| 5,388,775 A | | 2/1995 | Duguay |
| 5,514,237 A | * | 5/1996 | Emenaker ………. B65H 19/1873 156/159 |
| 6,817,566 B2 | | 11/2004 | Clifford et al. |
| 8,186,896 B2 | * | 5/2012 | Frost ………………. B65B 43/123 400/605 |
| 9,637,340 B1 | | 5/2017 | Butler et al. |
| 2017/0233210 A1 | * | 8/2017 | Kummel ……………. B65H 21/00 29/432 |

* cited by examiner

SYSTEM AND METHOD FOR ALIGNING AND JOINING THE SAME SIDES OF TWO WEB MATERIALS

BACKGROUND

Technical Field

The present invention is directed towards web handling apparatus and, more particularly to a web handling apparatus that is designed for use with web materials having sides with differing properties.

Background Information

Web splicers are well known in the art. Generally, these splicers have a running web roll and a ready web roll. Web from the running roll is conducted through a splicing head into a web accumulator and then to a downstream web consuming apparatus, such as a bag making machine. When the ready roll is about to expire, a splice sequence is initiated which decelerates and stops the running web at the splicing head, splices the already prepared leading end of the ready web to the now stationary running web and separates the spliced segment of the running web from its substantially empty roll core, following which the ready web is brought up to line speed. During this splice sequence, web is drawn from the accumulator to feed the web consuming machine so that there is no interruption in the web supply to that machine. The web material typically has registration marks to enable a splice to occur in registration, i.e., with a pattern on the web material aligning between the running roll and the ready roll. After splicing, the accumulator is refilled with web from the ready roll and the empty roll is replaced with a fresh roll which then becomes the ready roll for the next splice sequence.

In many applications, the web material may have two distinct sides, e.g., an A side and a B side. For example, the A side may be a printed side and the B side is a non-printed side. The non-printed side (side B) may be compatible with heat sealing, while the printed side (side A) may have an unacceptably high heat-sealing failure rate (e.g., 50%) if that side is used in a heat-sealing process. A noted disadvantage of current web splicers is that they cannot ensure that the same sides of the running web and the ready web are spliced together for each splice. Oftentimes, a first splice will be side A to side A, while the next splice will be side B to side B, before reverting to side A and side A, etc.

If a particular web material has a high failure rate for one side when heat sealed, the use of conventional splicers may produce an overall failure rate that is not acceptable in modern commercial applications. Alternatively, stopping a running process to manually align and splice a new roll using splicing tape across the web, and possibly over the edges of the material, is similarly unacceptable in modern commercial applications.

SUMMARY

The disadvantages of the prior art are overcome by providing a system and method for aligning and joining the same sides of two web material whose sides have differing properties, e.g., a heat sealable side and a non-heat sealable side. In an exemplary embodiment implemented in a web splicer, while an upper roll is running, an operator prepares the lower roll and initiates a splicing operation. A vertical cylinder is actuated that clamps and cuts the upper web material across a knife, after which the upper roll is rewound to remove material upstream of the cut. A horizontal cylinder is actuated to clamp the upper web material to a horizontal surface after which the vertical cylinder is actuated to move out of the web path. A pusher cylinder is then extended that aligns the upper web material with the prepared lower web material. The action of which results in the upper web material reversing orientation and presenting similar sides of the upper and lower web materials into contact with each other. A splice nip cylinder is extended that forces the web materials into contact at a point where a heating wire is activated to bond the two webs. The pusher cylinder and splice nip cylinder are then retracted, after which the lower roll begins feeding a downstream process. An additional cylinder on the lower preparation surface is then actuated to remove any scrap material that may have adhered to the heating wire during the bonding process.

When the upper roll is to be spliced to a running lower roll, the upper roll material is set by an operator before initiating the splicing operation. The nip splice cylinder is extended to cause the two webs into contact before being sealed by the heating wire. Once the nip splice cylinder is removed, the upper roll feeds the downstream process and the lower web material may be rewound.

BRIEF DESCRIPTION OF THE DRAWINGS

The above and further advantages of the present invention are described in connection with the accompanying drawings in which like reference numerals indicate identical or functionally similar elements, of which.

DETAILED DESCRIPTION OF AN ILLUSTRATIVE EMBODIMENT

Figure 1:
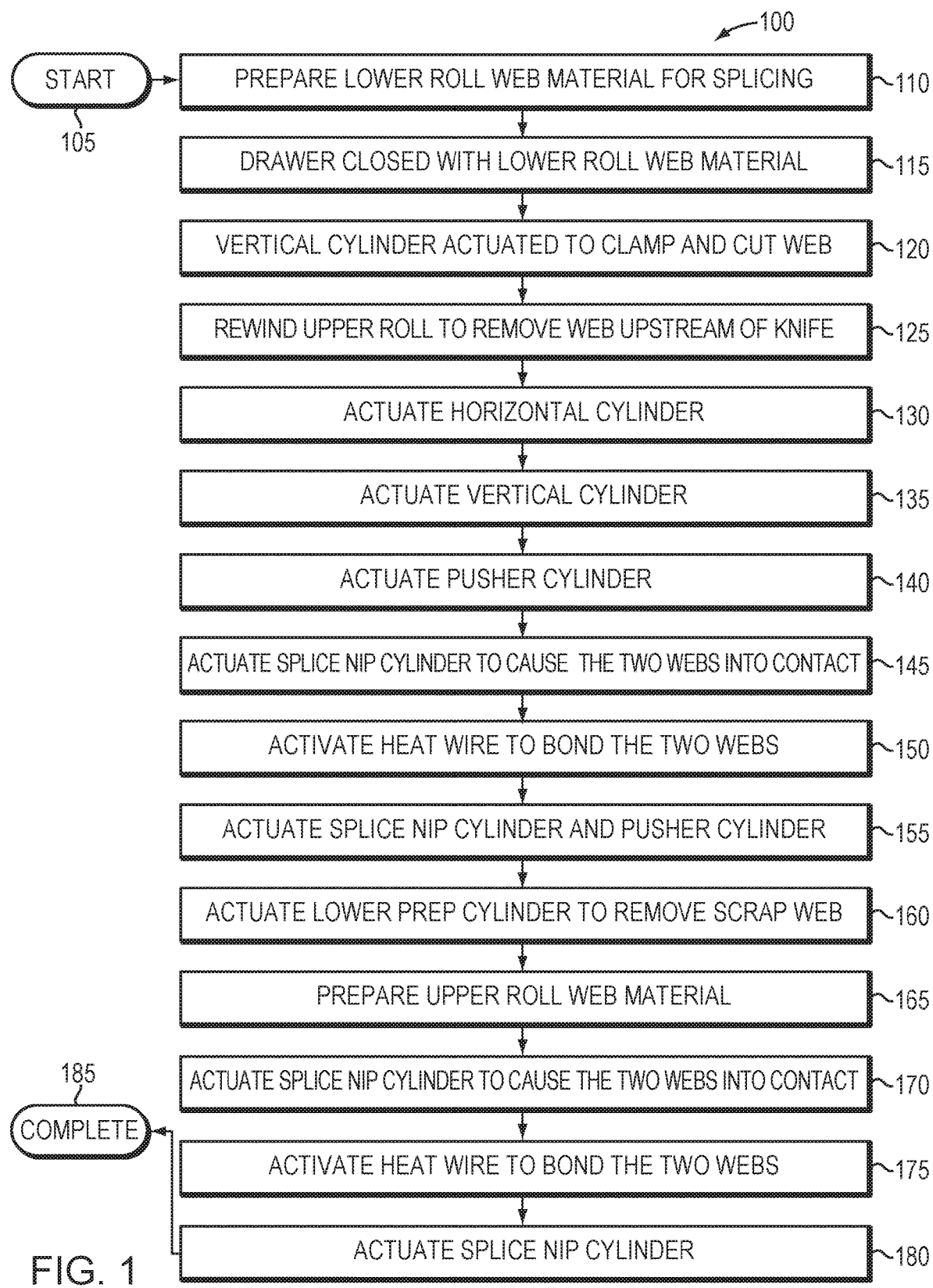
FIG. 1 is a flowchart detailing the steps of a procedure for aligning and joining the same sides of two web materials in accordance with an illustrative embodiment of the present invention.

FIG. 1 is a flowchart detailing the steps of a procedure 100 for aligning the same sides of two web materials whose sides have differing properties in accordance with an illustrative embodiment of the present invention. Illustratively, the invention is illustrated and described as part of a heat sealing splicing operation to heat seal the same sides of web materials together. However, it should be noted that the principles of the present invention may be utilized in any operation where it is desirable to ensure that the same sides of two web materials are aligned. Therefore, the description of an illustrative heat-sealing splicing operation should be taken as exemplary only. FIGS. 2-11 are exemplary cross-sectional views of an exemplary splicing apparatus that illustrate the arrangement of various components as the steps of procedure 100 are performed in accordance with an illustrative embodiment of the present invention. It should be noted that the principles of the present invention may be implemented in alternative arrangements. Therefore, the description of various components should be taken as exemplary only.

Illustratively, procedure 100 begins in an exemplary environment in which an upper roll of web material is currently being fed and a lower roll of web material needs to be spliced into operation. Procedure 100 also covers the corresponding splicing of an upper roll onto a running lower roll, beginning at step 165 below. As will be appreciated by those skilled in the art, procedure 100 may be illustratively performed a plurality of times repeatedly in operation as upper and lower rolls are replaced over and over while the line is in operation. A noted advantage of the present invention is that the splicing operations enable the same side of materials, e.g., a heat-sealable side, to be sealed together. Exemplary procedure 100 is described and illustrated as being directed towards an apparatus that utilizes an upper and a lower roll of web material. However, it should be noted that in alternative embodiments of the present invention, different arrangements of rolls of web material may be utilized. Therefore, the description of an upper roll and a lower roll of web material should be taken as exemplary only.

The procedure 100 begins in step 105 continues to step 110 where a lower roll of web material is prepared for splicing. As noted, procedure 100 assumes that the initial state is that the upper roll is currently feeding a downstream process and that the ready roll is the lower roll. Should the lower roll be currently feeding the downstream process, the procedure would begin in step 165, described further below, which describes splicing the upper roll onto the running lower roll.

Figure 2:
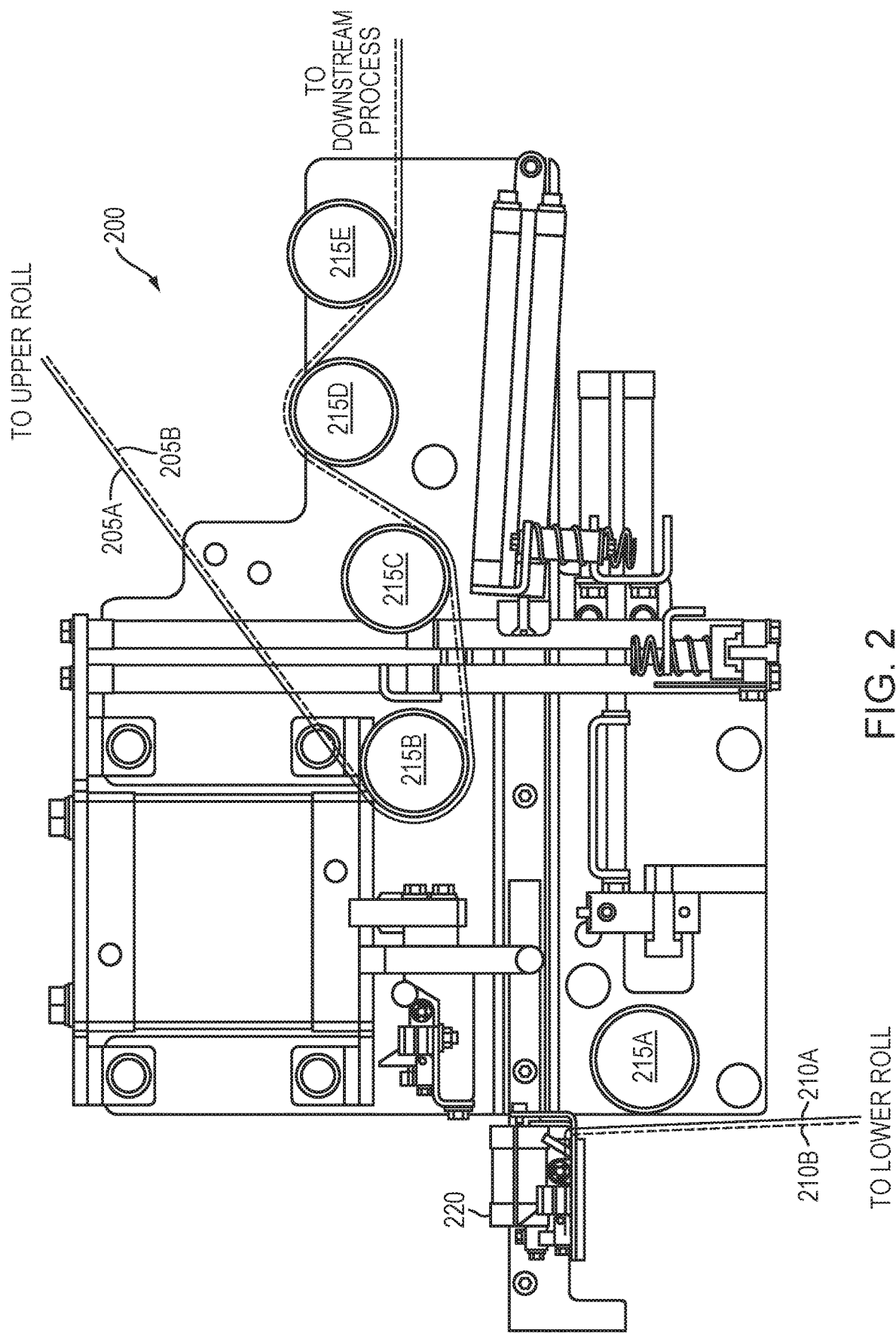
FIG. 2 is a cross-section of an exemplary splicing apparatus for aligning and joining the same sides of two web materials in accordance with an illustrative embodiment of the present invention.
Figure 3:
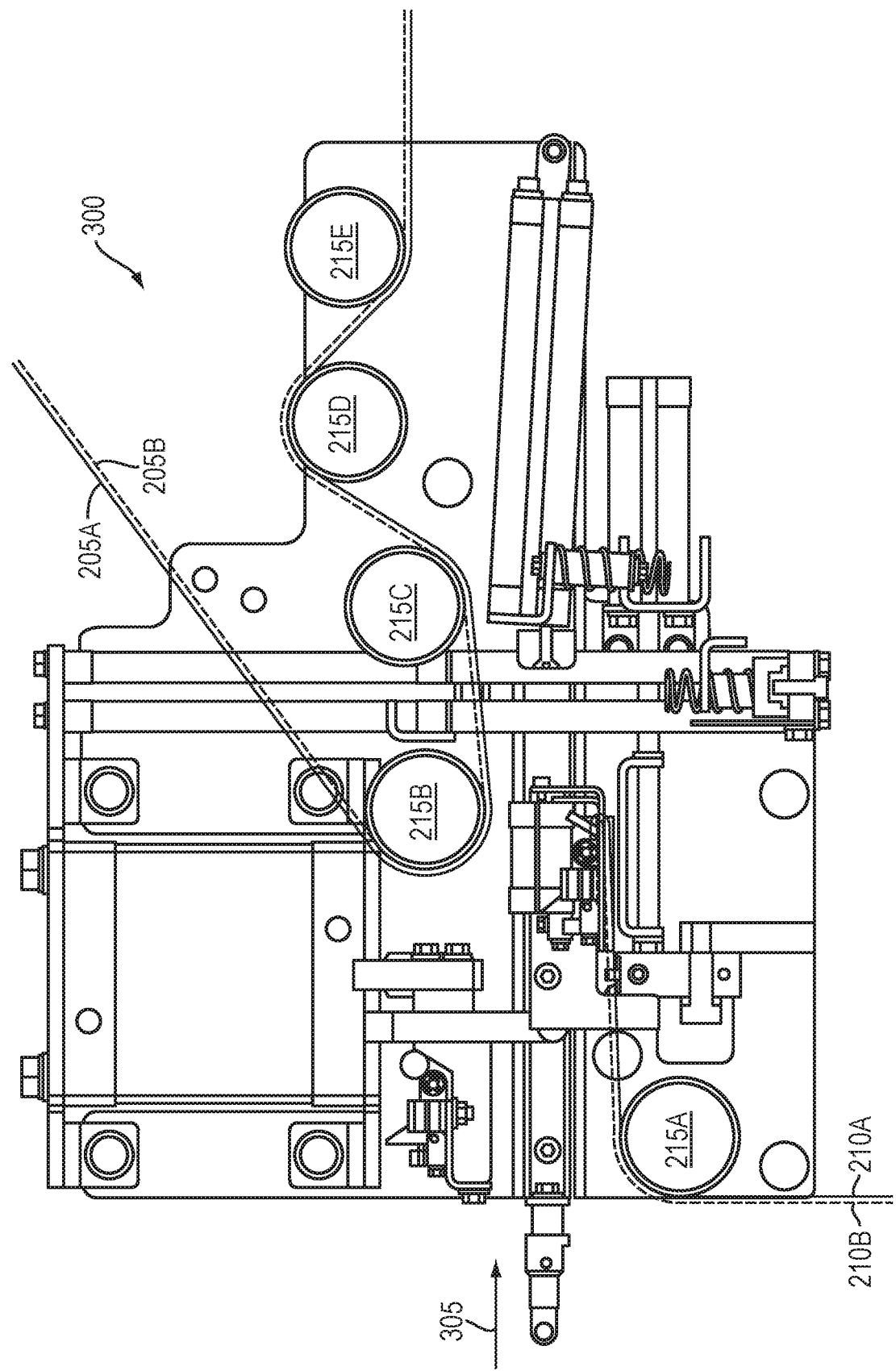
FIG. 3 is a cross-section of an exemplary splicing apparatus for aligning and joining the same sides of two web materials in accordance with an illustrative embodiment of the present invention.

This preparation of the lower roll is shown in relation to FIG. 2, which illustrates a cross-sectional view 200 of an exemplary splicing apparatus that implements same side sealing in accordance with an illustrative embodiment of the present invention. View 200 illustrates the web material 205 coming from the upper roll. Illustratively, the upper web material 205 is shown as having a solid line 205A, which is representative of a printed side of web material and non-printed side 205B, which is shown as a dashed line in the figures. Similarly, lower web material's sides are shown as 210A and 210B. It should be noted that the upper web material 205 and lower web material 210 are illustrated as two parallel lines for illustrative purposes to be able to differentiate a printed and non-printed side. It should be noted that accordance with alternative embodiments of the present invention, the printed and/or non-printed sides of web material may have two different sides that may or may not be a printed and non-printed side. More generally, web material side 205A corresponds to the same side of lower web material side 210A, while upper web side 205B corresponds to lower web material side 210B. In accordance with alternative embodiments of the present invention, any differentiation between the A and B sides may be seen in operation. Therefore, the description of printed and non-printed sides should be taken as exemplary only. The principles of the present invention ensure that the same sides of web material are aligned together in a consistent manner regardless of which roll is currently running. This enables an operation, e.g., a splicing and heat-sealing operation to be performed on the same sides of the web materials. In the examples shown in FIGS. 2-11, the B sides are to be sealed together. However, as will be appreciated by those skilled in the art, by reversing the material on the rolls, the A sides may be sealed in alternative embodiments of the present invention. Therefore, the description of the B sides being sealed together to be taken as exemplary only.

Exemplary web material coming from the upper roll 205 traverses a plurality of idlers 215B, C, D, E before heading to a downstream process (not shown). In accordance with an illustrative embodiment, the downstream process may comprise of an accumulator (not shown) as is well known to those skilled in the art. The accumulator may store lengths of the web material to feed further downstream process apparatus. Further, the accumulator may also provide tension on web material as it is heading through the splicing apparatus in accordance with illustrative embodiments of the present invention. As described below, the accumulator may permit web material to be rolled back into the splicing apparatus during operation of the splicing procedure.

Lower web material 210 enters from a lower roll into a moveable drawer 220 that has been opened towards an operator. In operation, an operator will align the lower web material 210 in the drawer 220, typically using registration points so that the splice will be in registration with the upper web material 205. An idler 215 is located to support the lower web material 210 when the drawer 220 is inserted into the splicing apparatus, as described further below.

Once the lower roll web material has been prepared, the drawer is then closed with the lower roll web material in step 115. This is shown is FIG. 3, which illustrates an exemplary cross-sectional view 300 of the splicing apparatus. As can be seen in view 300, the drawer 220 has been inserted, represented by arrow 305, into the apparatus causing the lower web material to engage the idler 215A. The lower web material 210 is now in position for the splicing operation to be performed. Typically, an operator may activate the splicing operation that is automated by the splicing apparatus.

Figure 4:
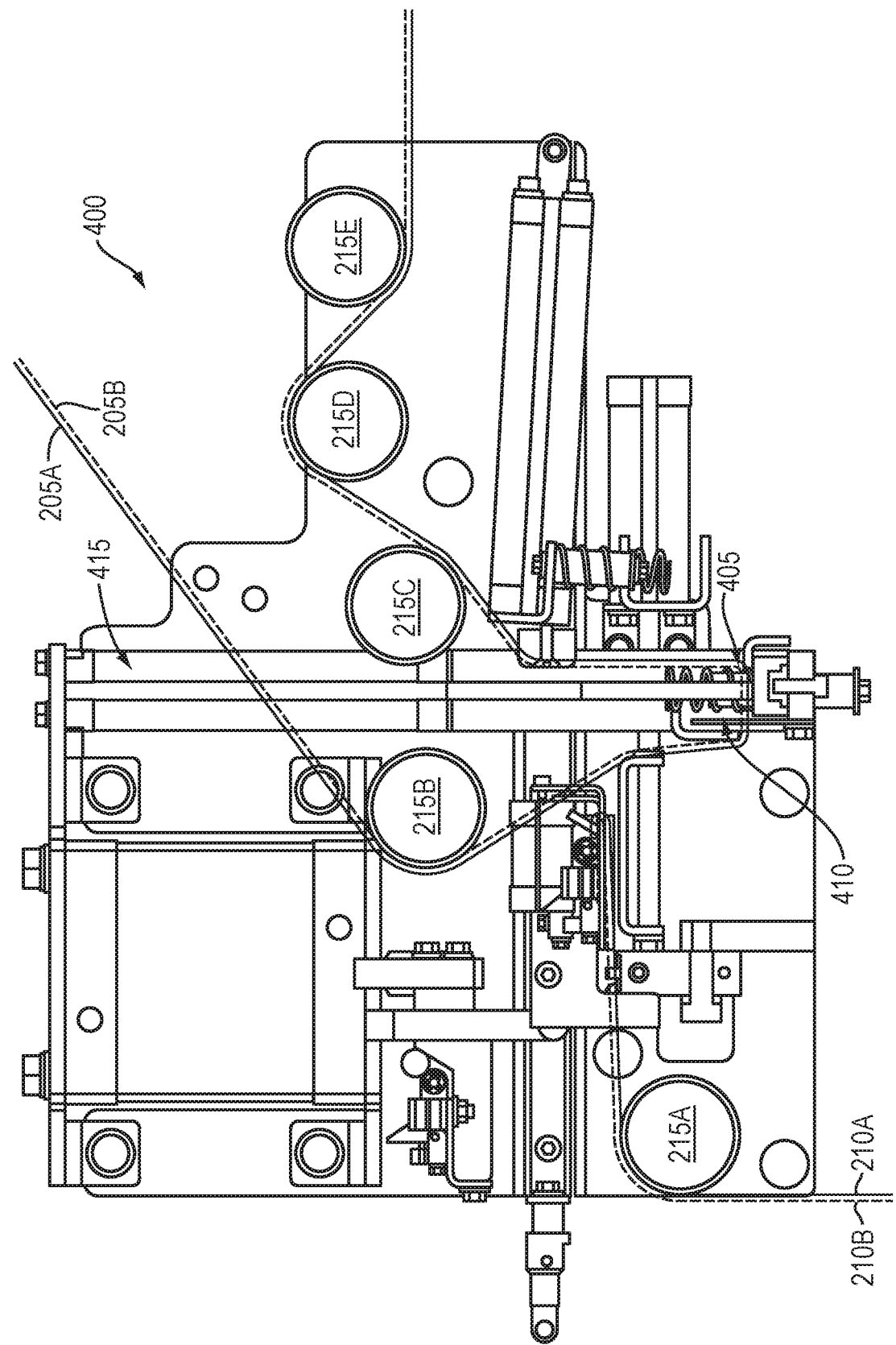
FIG. 4 is a cross-section of an exemplary splicing apparatus for aligning and joining the same sides of two web materials in accordance with an illustrative embodiment of the present invention.

In step 120, a vertical cylinder 415 is actuated to clamp and cut the upper web 205. This is shown in exemplary FIG. 4 as the vertical cylinder 415 is extended to push the upper web material 205 so that it may be clamped by clamp 405 and cut by knife 410. It should be noted that FIG. 4 illustrates the vertical cylinder 415 being extended; however, it is expressly contemplated that in alternative embodiments of the present invention, the vertical cylinder may be retracted. Therefore, the term actuated is used herein to mean extended, retracted, rotated, etc. Illustratively, the knife 410 is stationary and cuts the web material 205 as the vertical cylinder 410 presses the web material across the blade of the knife 410. In accordance with alternative embodiments of the present invention, the knife 410 may be actuated so that it moves to engage the web material. Further, as will it be appreciated by those skilled in the art, alternative cutting mechanisms may be utilized other than a stationary knife 410 in accordance with alternative embodiments of the present invention. Therefore, the description of the use of a stationary knife 410 to cut the upper web material 205 should be taken as exemplary only.

Figure 5:
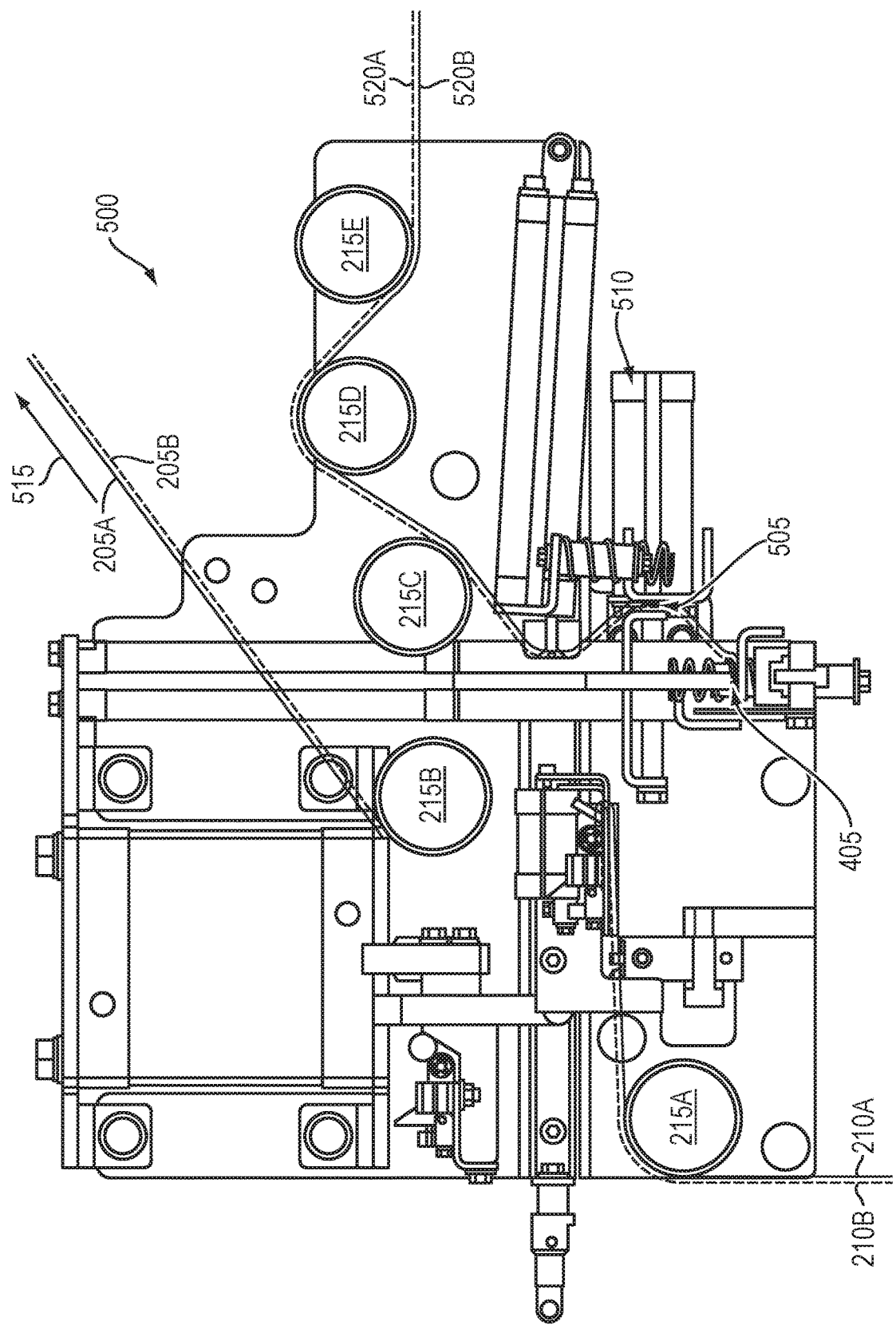
FIG. 5 is a cross-section of an exemplary splicing apparatus for aligning and joining the same sides of two web materials in accordance with an illustrative embodiment of the present invention.

Then, in step 125, the upper roll is rewound to remove the web upstream of the knife 410. Additionally, the horizontal cylinder is actuated in step 130. This is illustrated in FIG. 5 which shows that the upper web material is rewound, denoted by arrow 515, towards the upper roll. The remainder of the upper web material 205 remains clamped by both the vertical and horizontal cylinders at locations 405, 505. Once the upper roll has been rewound, the upper roll may be replaced with a new roll of material to be used in a future splicing operation.

Figure 6:
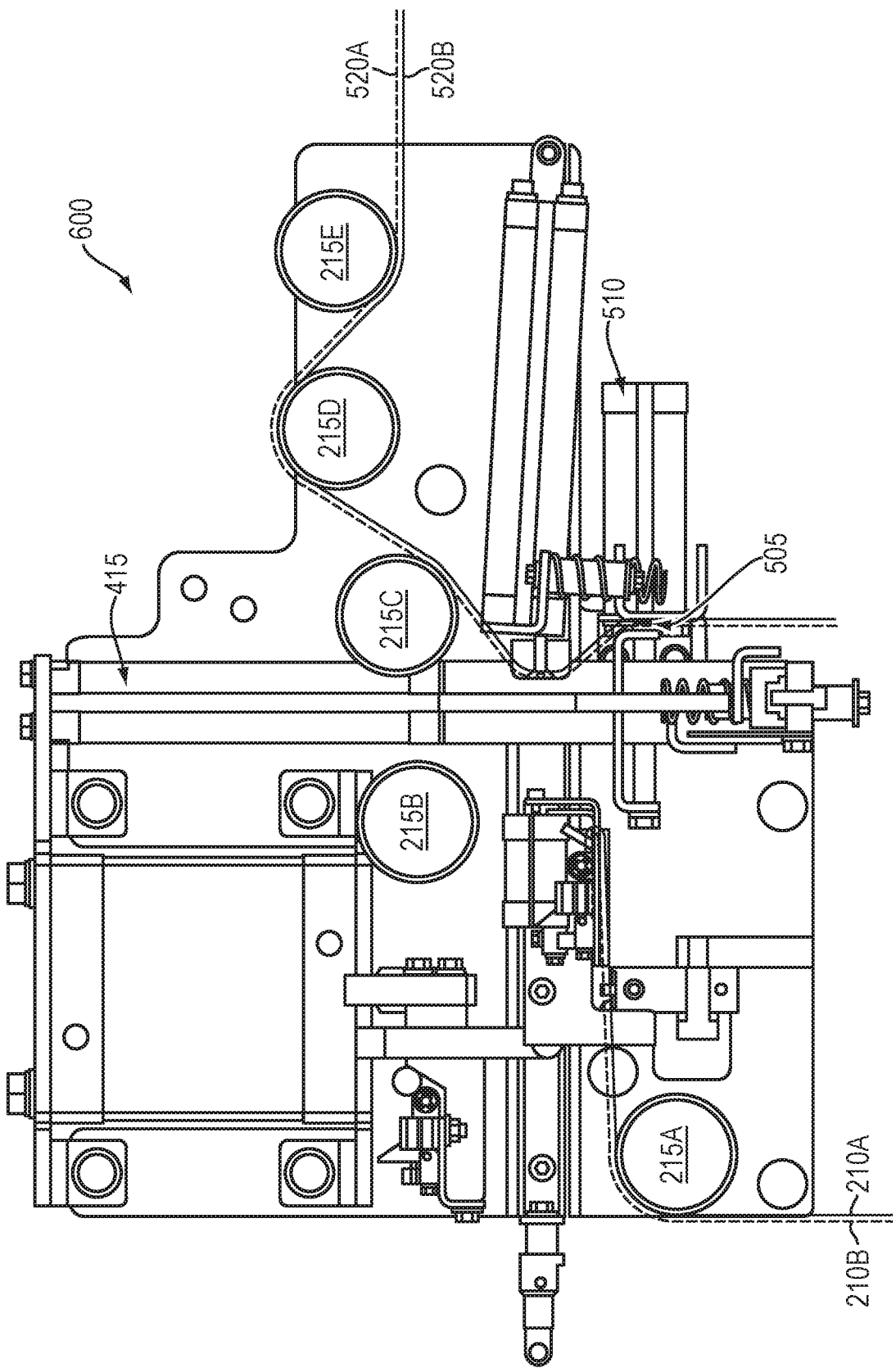
FIG. 6 is a cross-section of an exemplary splicing apparatus for aligning and joining the same sides of two web materials in accordance with an illustrative embodiment of the present invention.

The vertical cylinder is then actuated again in step 135. The web material 205 remains clamped by the horizontal cylinder 505 as seen in FIG. 6. At this point, a section of waste material hangs beneath the horizontal cylinder clamp 505.

Figure 7:
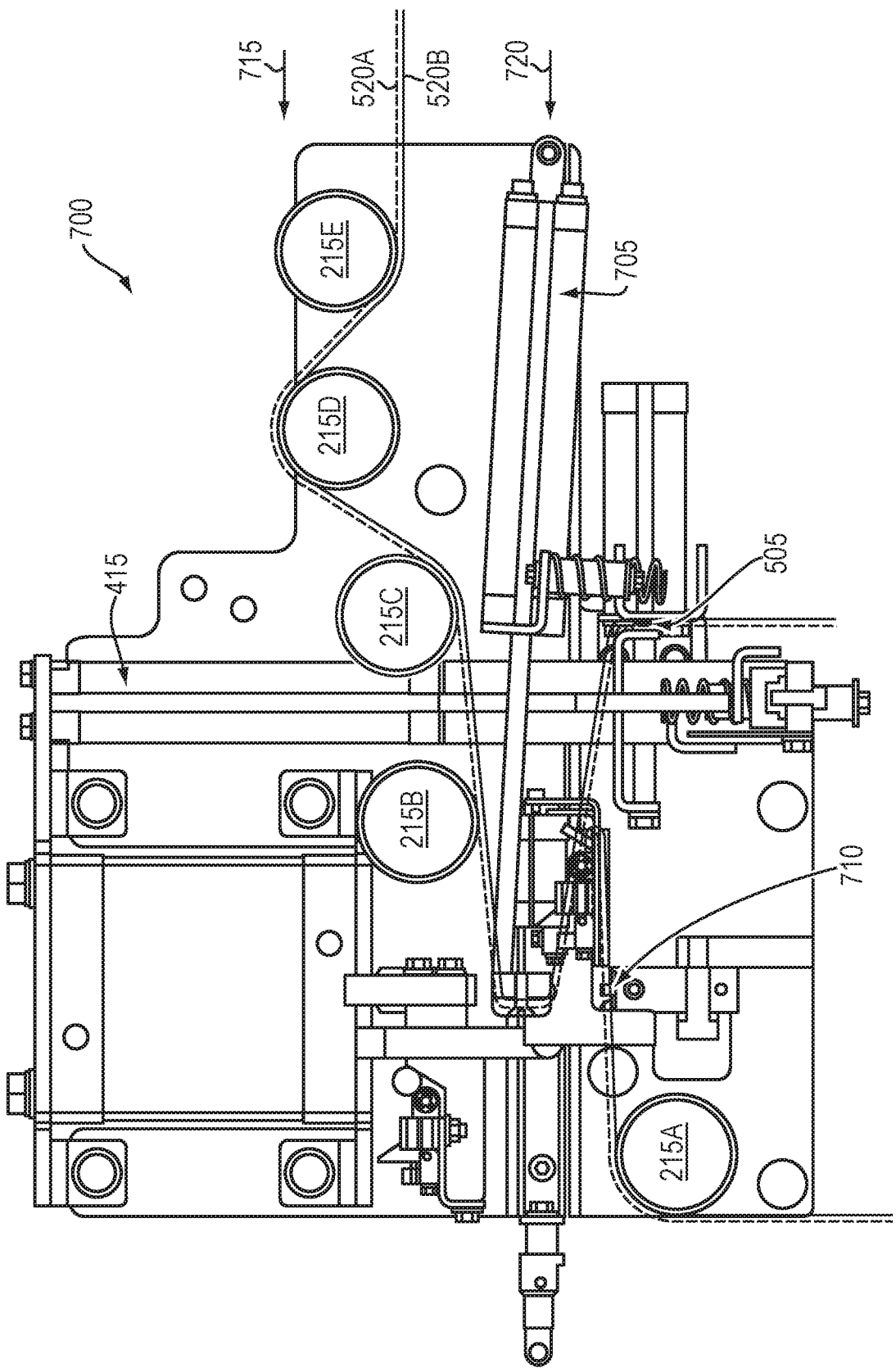
FIG. 7 is a cross-section of an exemplary splicing apparatus for aligning and joining the same sides of two web materials in accordance with an illustrative embodiment of the present invention.
Figure 8:
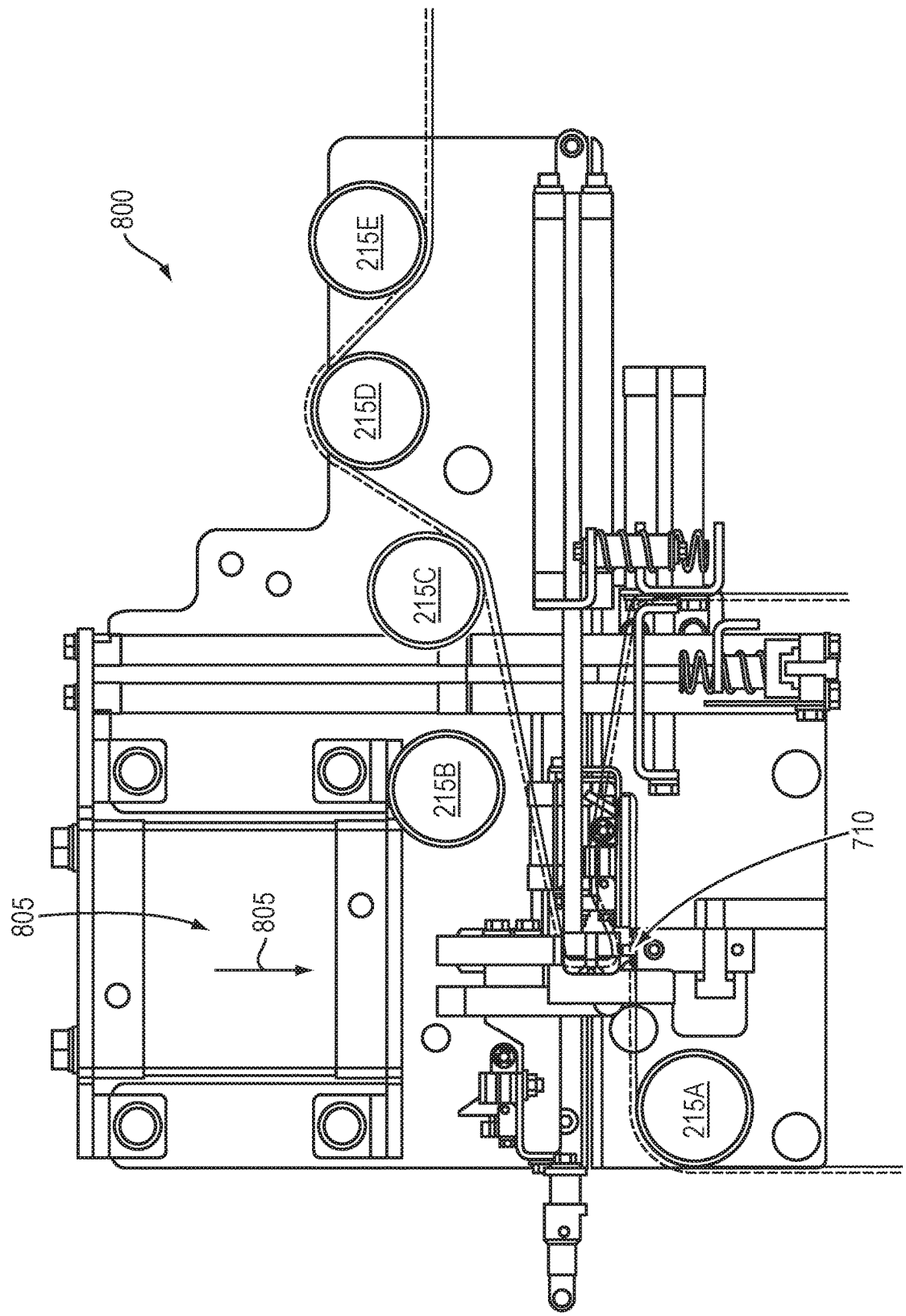
FIG. 8 is a cross-section of an exemplary splicing apparatus for aligning and joining the same sides of two web materials in accordance with an illustrative embodiment of the present invention.

The pusher cylinder 705 is actuated in step 140. As the pusher cylinder 705 is actuated, the upper web material 205 is still clamped at clamp 505. The actuation of the pusher cylinder 705 causes material to be drawn from the downstream process, e.g., an accumulator, so that the upper web material is extended to be in alignment with a splice nip cylinder and over a heating wire 710 as shown in FIG. 7. Illustratively, the pusher cylinder 705 is actuated so that a portion of the upper web material 205 is in alignment with lower web material 210 in alignment with a heating wire 710.

The splice nip cylinder 805 is then actuated to cause the two webs (upper roll and lower roll) to come into contact with each other in step 145. The heating wire 710 is then activated to bond the two webs in step 150. This is illustrated in exemplary FIG. 8 which shows the upper web material 205 being forced into contact with the lower web material 210 by the splice nip cylinder 805. The materials come into contact at the location of the heating wire 710. It should be noted that while the present invention discloses the use of a heating wire 710 to perform the sealing/splicing operation, in accordance with alternative embodiments of the present invention other techniques to splice the upper and lower webs may be utilized. Therefore, the description of heating wire 710 should be taken as exemplary only. More generally, the principles of the present invention may be utilized by any operation that requires the same sides of two web materials to be in contact with each other. While this description is written in terms of being implemented in a web splicer, the principles of the present invention may be implemented in other machines. Therefore, the description of use in a web splicer should be taken as exemplary only.

Further, as noted above, the lower web has been prepared so that it may be in registration with the upper web at the point of heating. This ensures that printed material, such as that printed on sides 205B and 210B are in alignment/registration so that after the splicing operation, the web will be continuous as it proceeds to the downstream. This registration works to ensure that printed material is continuous on the spliced web and that no breaks occur in the printed design. It should be noted that in alternative embodiments of the present invention, splices may not be performed in registration. Therefore, the description of splicing occurring in registration should be taken as exemplary only.

Figure 9:
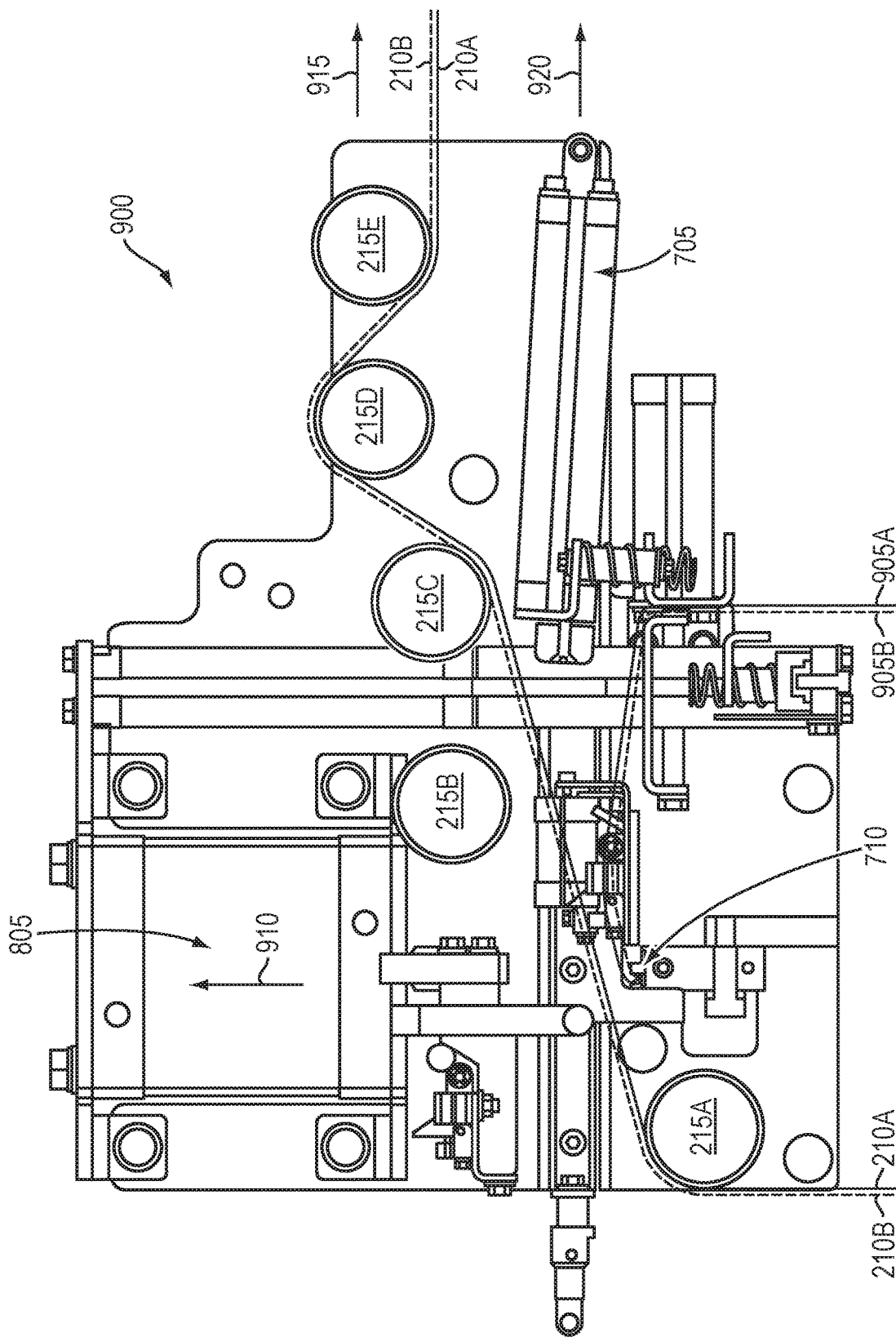
FIG. 9 is a cross-section of an exemplary splicing apparatus for aligning and joining the same sides of two web materials in accordance with an illustrative embodiment of the present invention.
Figure 10:
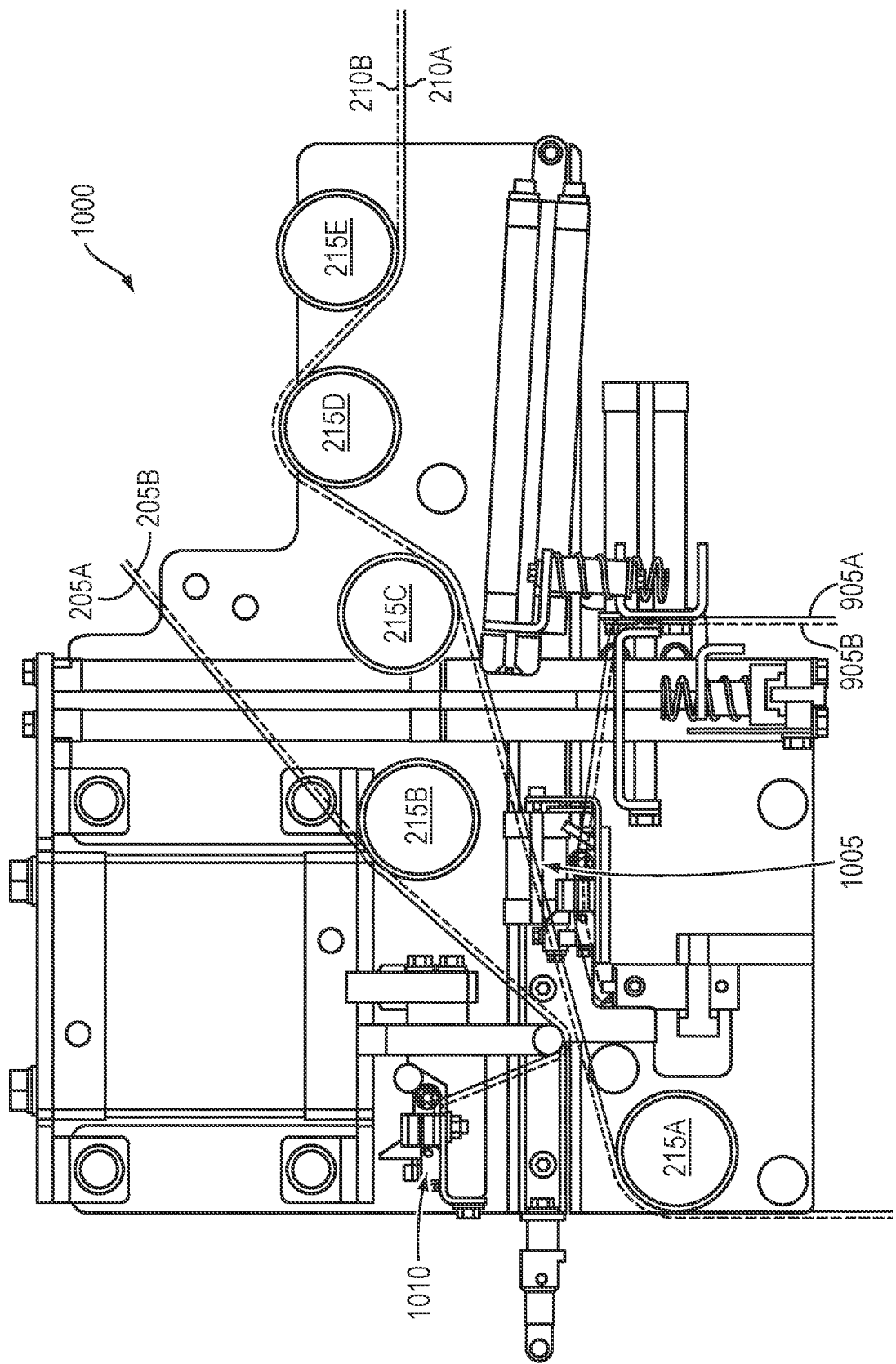
FIG. 10 is a cross-section of an exemplary splicing apparatus for aligning and joining the same sides of two web materials in accordance with an illustrative embodiment of the present invention.

The splice nip cylinder is actuated as well as the pusher cylinder in step 155. This actuation is illustrated in FIG. 9 by arrow 910 showing the direction of movement of the splice nip cylinder and by arrow 920 showing the direction of movement of the pusher cylinder. As this point, the lower roll is feeding the apparatus and the lower web material 210 is flowing from the lower roll over idlers 215A, C, D, E to the downstream process in the direction of arrow 915.

The lower prep cylinder 1005 is actuated to remove the scrap web 905A,B in step 160. The scrap web 905A,B may be remnants of the web that was stuck to the heating wire after the previous splicing operation. The operator prepares the upper web in step 165. This can be seen in view 1000 (FIG. 10) where the upper web material 205 has been extended into the apparatus and clamped 1010.

Figure 11:
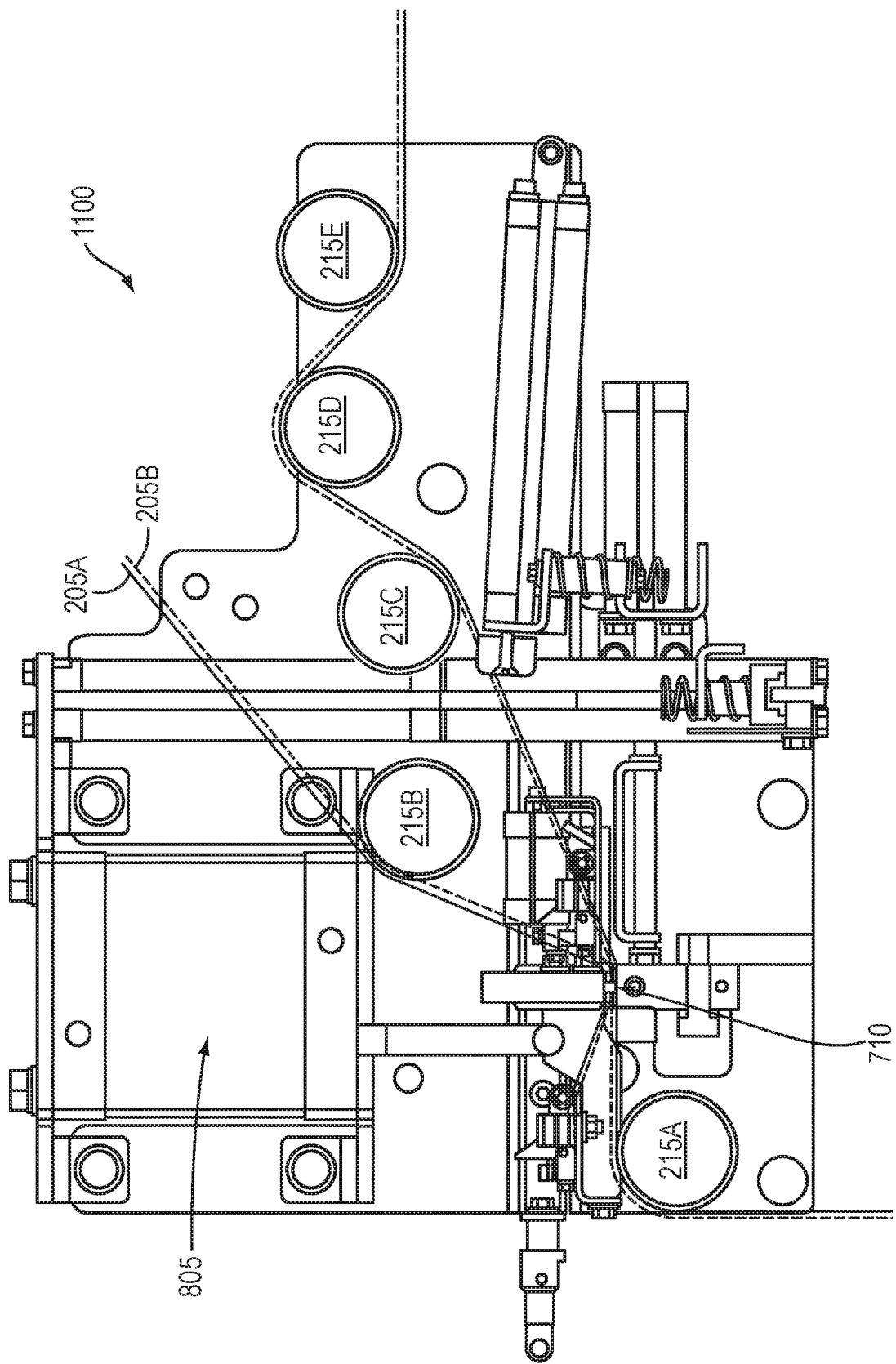
FIG. 11 is a cross-section of an exemplary splicing apparatus for aligning and joining the same sides of two web materials in accordance with an illustrative embodiment of the present invention.

The splice nip cylinder is then actuated to cause the two webs to come into contact with each other at the heating wire in step 170. The heat wire is activated to seal the two webs together in step 175. This is illustrated in FIG. 11 that shows the two webs being joined by the heating wire 710.

The splice nip cylinder is actuated in step 180. Once the splice nip cylinder has been actuated, the upper roll may then be fed onto the downstream process as operation continues. As the accumulator or other downstream process exerts tension to the upper roll web material, the cross-sectional view of the exemplary apparatus will transition from that shown in FIG. 11 to that shown in FIG. 2. The lower roll could then be replaced for a future splicing operation to allow the manufacturing process to continue. During normal operation, an operator would initiate procedure 100 again to continue the process.

The procedure 100 then completes in step 185. As noted above, exemplary procedure 100 identifies the steps to perform both a transition from an upper roll to a lower roll, as well as the transition from a running lower roll to a ready upper roll. In operation, procedure 100 will be repeated a plurality of times during operation of the splicing apparatus. As will be appreciated by those skilled in the art, conventional or modern web material processes often run uninterrupted for substantial periods of time. By utilizing the teachings of the present invention, rolls may be spliced to each other in a manner to ensure that the same sides of materials are sealed to each other, thereby obviating noted disadvantages of having dissimilar sides sealed together.

It should be noted that various components have been described as being actuated. While the figures and description may depict a particular direction of movement, it is expressly contemplated that in alternative embodiments, the direction of movement may vary. Therefore, the term actuated should be interpreted broadly to include any direction of movement, including non-linear motions.

The present invention has been described in accordance with various illustrative embodiments. However, it is expressly contemplated that the principles of the present invention may be implemented in a plurality of alternative embodiments. The various components and their orientations in exemplary splicing apparatus may be varied dependent on implementation requirements. For example, while an upper roll and lower roll have been described and shown, the principles of the present invention may be utilized with rolls in differing orientations, e.g., side by side. Therefore, the various descriptions of operations, the order in which they are performed, particular components and their orientations, etc. should be taken as exemplary only.

What is claimed is:

1. A splicing apparatus comprising:
   a lower roll drawer configured to hold a lower web material in alignment with a first predefined location;
   a first cylinder actuated to cause an upper web material to be engaged by a first clamp, the first cylinder also configured to cause the upper web material to engage a cutting edge to separate the upper web material into a downstream upper web portion and an upper web portion;
   a second cylinder actuated to cause the downstream upper web portion to be engaged by a second clamp;
   first cylinder actuating to return it to an initial position;
   a third cylinder configured to cause the downstream upper web portion to be placed in alignment with the first predefined location; and
   a fourth cylinder configured to cause a first side of the downstream upper web material to be in contact with a first side of the lower web material at the first predefined location.

2. The splicing apparatus of claim 1 wherein the first side of the upper web material is a heat-sealable material.

3. The splicing apparatus of claim 1 wherein the first side of the downstream upper web material is a heat-sealable material.

4. The splicing apparatus of claim 1 wherein the cutting edge is a stationary knife.

5. The splicing apparatus of claim 1 wherein the lower web material has a second side, wherein the second side of the lower web material has at least one differing property than the first side of the lower web material.

6. The splicing apparatus of claim 1 wherein the downstream upper web material has a second side, wherein the second side of the downstream upper web material has at least one differing property than the first side of the downstream upper web material.

7. The splicing apparatus of claim 1 further comprising:
   a heating wire located to perform a heat sealing operation of the first side of the downstream upper web material and the first side of the lower web material at the first predefined location.

8. A method comprising the steps of:
   securing, using a lower roll drawer, a lower web material in alignment with a first predefined location;
   clamping, using a first set of one or more clamps, an upper web material;
   separating the upper web material to into a downstream upper web portion and an upper web portion via a first cylinder;
   clamping, the downstream upper web portion, wherein a second cylinder causes the downstream upper web portion to be clamped by a second set of one or more clamps;
   causing, using a third cylinder, the clamped downstream upper web portion to be extended so that a first side of the downstream upper web portion is in alignment at the first predefined location; and
   compressing, using a fourth cylinder, the first side of the downstream upper web portion with a first side of the lower web material at the first predefined location.

9. The method of claim 8 further comprising performing a heat sealing operation of the first side of the downstream upper web portion and the first side of the lower web material at the predefined first location.

10. The method of claim 9 further comprising clearing a waste portion of the downstream upper web portion.

11. The method of claim 8 wherein separating the upper web material comprises cutting the upper web material using a knife edge.

12. The method of claim 11 wherein the knife edge is stationary.

* * * * *